United States Patent [19]

Banerjee

[11] 4,097,711
[45] Jun. 27, 1978

[54] ROLLER SHELL HARD COATING

[75] Inventor: Bani Ranjan Banerjee, Skillman, N.J.

[73] Assignee: Ingersoll-Rand Company, Woodcliff, N.J.

[21] Appl. No.: 723,786

[22] Filed: Sep. 16, 1976

[51] Int. Cl.² .............................................. B23K 9/04
[52] U.S. Cl. ................................. 219/76.15; 219/76.1
[58] Field of Search .............. 219/76, 77, 76.1, 76.15; 148/16.5

[56] References Cited

U.S. PATENT DOCUMENTS

| 2,043,412 | 6/1936 | Zublin | 219/77 X |
| 2,709,213 | 5/1955 | Gibson | 219/76.15 |
| 2,962,399 | 11/1960 | Ruppert | 148/16.5 |
| 3,237,928 | 3/1966 | Warman | 148/16.5 |
| 3,405,247 | 10/1968 | Hlivka | 219/76.15 |
| 3,684,585 | 8/1972 | Stroup | 148/16.5 |
| 3,823,030 | 7/1974 | Hudson | 219/76 X |

Primary Examiner—E. A. Goldberg
Attorney, Agent, or Firm—Walter C. Vliet

[57] ABSTRACT

Invention covers a method of hard surfacing machine parts, specifically the invention discloses a method of impregnating the surface of cylindrical pellet mill roller shells with tungsten carbide particles applied with a tungsten inert gas welding process. In the method of this invention, the surface layer of the roller shell is first carbon enriched by surface gas carburizing prior to welding. The resulting surface exhibits good distribution of tungsten carbide particles and resistance to surface cracking.

12 Claims, 3 Drawing Figures

ROLLER SHELL HARD COATING

BACKGROUND OF THE INVENTION

Hard surfacing is a process of applying a layer of wear-resistant metal onto a metal part by means of welding in order to improve the wear characteristics of the surface in use. It may be used to improve the expected life of new parts or extend the life of used parts in service. In the specific embodiment herein described to illustrate the invention, a hard wear-resistant surface is applied to pellet mill roller shells.

Pellet mill roller shells are cylindrical members which are normally mounted on a bearing shaft usually in combinations of two, three, or four to counterbalance the forces developed during the extruding process. The roller shells revolve in a cylindrical steel die having radial extruding die passages. The cylindrical die is normally in the order of several inches thick and the force generated by the roller shell rolling on the internal surface of the die is extremely high, sometimes in the order of 100,000 psi or more. It is this force that extrudes the product to be pelletized through the radial dies. Numerous means are employed to spread the feed before the oncoming roller shell.

As one skilled in the art can appreciate, with each revolution or pass of the roller shell, a small quantity of feed is forced into the die. It can be appreciated that with the repeated high cyclic load experienced by the roller shells that the material from which they are made must exhibit a high degree of toughness. In addition, several of the feed products for pelleting mills are abrasive in nature and under the high pressures required for extruding the pellet, wear becomes a significant problem. It is for this reason that a hard surface is applied to the roller shells.

Approximately ten years ago, the concept of hard surfacing roller shells was introduced to improve their life. However, it was difficult to obtain hard surfaces with uniform dispersion of the hard surface particles within the surface layer. Problems also arose with cracking of the surface layer under the extreme pressures necessary to pelletize certain materials.

SUMMARY OF THE INVENTION

It is an object of the present invention to disclose a method for uniformly applying hard surface particles. Tungsten carbide particles are applied to carbon steel roller shells in the case of the preferred embodiment.

It is an object of this invention to teach a precarburization or carbon enrichment of the surface layer of roller shell prior to the welding process involved in applying the hard surface layer. The precarburization permits weld overlays that are approximately one half as deep as those achieved with conventional hard surfacing.

It is an object of the invention to teach the effectiveness of enriching the surface layer with carbon to improve the distribution of hard carbides and the uniformity of the applied hard surface.

It is further an object of this invention to isolate the parameters required for acceptable hard surface layers, including but not necessarily limited to: carburizing the surface of a carbon steel, overlaying the surface with tungsten carbide particles introduced into the weld puddle formed in a tungsten inert gas welding process, followed by an after welding post-welding heat treatment to achieve the required hardness. These and other objects are achieved in a method of hard surfacing steel which comprises: carburizing the steel surface to an effective case depth equal to at least one half the depth of the hard surfacing required, applying the hard surfacing particles in a weld puddle formed by a gas metal arc welding process, and heat treating the weld to achieve the required properties of base and surface structure.

DESCRIPTION OF THE PREFERRED EMBODIMENT

Figure 1:
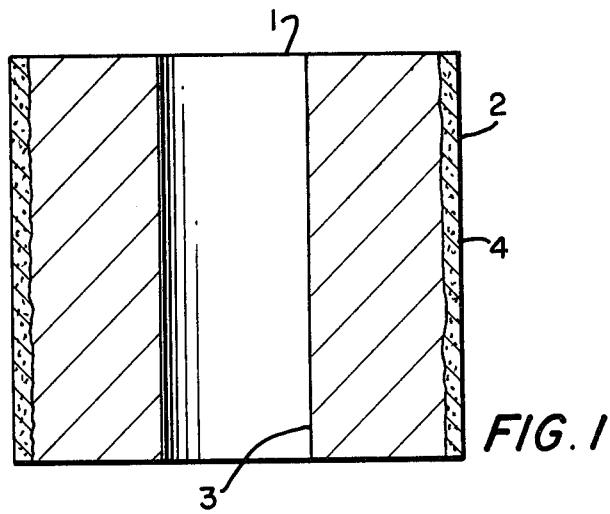
FIG. 1 shows the cross section of a typical pellet mill roller shell.

In FIG. 1, a typical pellet mill roller shell is shown. Roller shells are typically 7 to 10 inches in diameter and 4 to 7 inches in width. In addition, they are provided with a 4 to 5-inch bore for mounting on the bearing shaft. Roller shells are typically made from a relatively tough steel. For convenience, an AISI 4140 steel was chosen to illustrate the preferred embodiment. In general, it is anticipated that wear-resistant surface according to this invention would be applied to any of the lower carbon tough carburizing grades of low-alloy steels, such as AISI 8620, 4620, 4130, 4330, 1315, 3120, or 1112. Economics may dictate the use of a low carbon mild steel such as AISI 1020. The choice of steel being essentially dependant on load requirements of the particular application.

In FIG. 1, the roller shell is indicated by reference numeral 1. It has an outer surface 2, and the internal or bearing surface 3. In FIG. 1, the outer surface is shown coated with a tungsten carbide wear-resistant surface 4. It is the application of this wear-resistant surface that is the subject of the invention.

Figure 2:
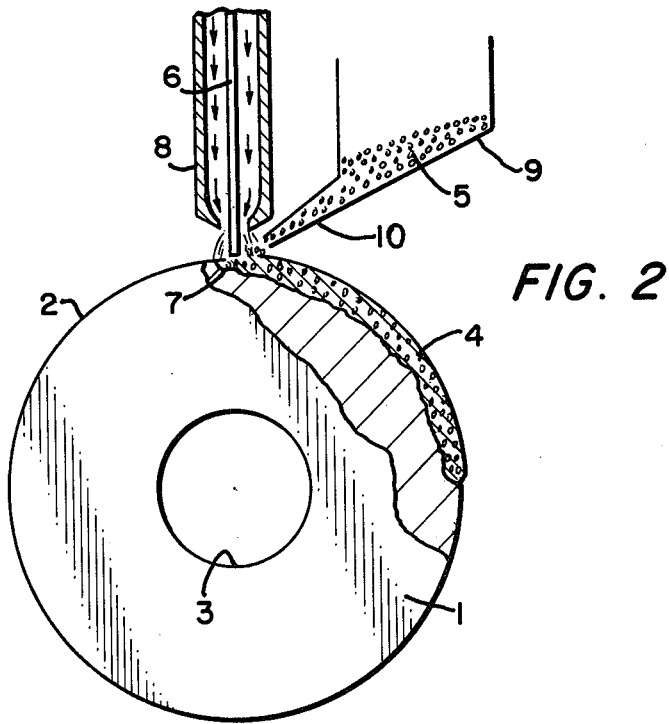
FIG. 2 is a schematic showing the method of applying tungsten carbide particles to the roller shell by means of a tungsten inert gas weld.

FIG. 2 shows schematically a method of applying tungsten carbide particles 5 to the roller shell surface. A non consumable tungsten electrode 6 is utilized to establish a welding arc. The arc produces a weld puddle 7 on the surface of the roller shell 2. An inert gas, usually Helium or Argon, is fed to the area of the weld arc via conduit 8 which usually surrounds the tungsten electrode 6. The conduit 8 directs the inert gas into the weld area to shield the weld puddle from the surrounding atmosphere. A tungsten carbide particle feeder 9 supplies a constant stream of tungsten carbide particles to the weld area by means of a feed tube 10. The tungsten carbide particles fall into the weld puddle and solidify in the base metal matrix when the tungsten arc passes across the surface of the shell. Either the shell surface or the electrode and feeder combination may be moved relative to the roller shell surface. The speed with which the arc moves across the shell surface and the power utilized in establishing the arc determine the size and depth of the weld puddle. By controlling these variables, the depth of hard surfacing may be determined. In addition, the amount of tungsten carbide particles entering the weld puddle is controlled by the feeder. Both the process of tungsten inert gas welding and addition of tungsten carbide particles to the weld puddle are well known in the art.

Figure 3:
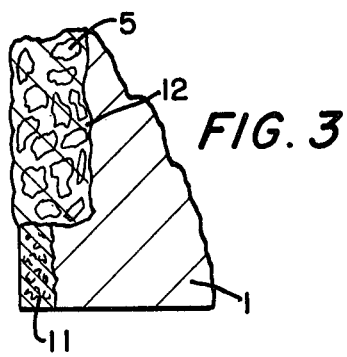
FIG. 3 is a partial section of the roller shell showing the details of the weld area.

The prior art has yielded welds which are generally unsatisfactory for the severe surface conditions of hard surfacing of roller shell. Often, the weld surface would crack or the outer wear surface would be depleted of the wear-resistant carbide particles. I have invented a method for applying a tungsten carbide particle wear surface to a roller shell by means of the tungsten inert gas welding process which produces results uniquely suited for use on roller shells. I have found that a uniform hard surface contained in a tough matrix may be formed by inclusion of a critical precarburization step. In my invention, the surface of the roller shell is first carbon enriched to a predetermined depth as shown by reference numeral 11 on FIG. 3. The following parameters have proven satisfactory:

To achieve the weld of the preferred embodiment, a roller shell made of AISI 4140 steel was first carburized by a surface gas carburization process to a depth of 0.035 to 0.040 inches. The carburizing atmosphere used was an endothermic gas atmosphere at 1600° F (871° C). The atmosphere had a dew point in accordance with standard carburizing tables to achieve an 0.8 percent surface carbon enrichment at 1600° F (871° C). A balanced wave power supply was utilized for greater stability of the non consumable tungsten electrode arc. The travel speed of the roller shell relative to the arc did not appear to be too critical. An interpass overlap of 3/16 inches was found to be adequate for achieving a uniform weld. Sufficient amperage was utilized to achieve a melt puddle depth of 0.075 inches to 0.092 inches, with an average depth of 0.088 inches. The solidified weld puddle is shown by reference numeral 12 on FIG. 3 (weld proceeding top to bottom).

After welding, a post weld heat treatment was used in order to achieve the required matrix hardness. This was a standard austenizing/quench and temper treatment designed to achieve the required matrix hardness. The specific temperatures and times of treatment would be determined for each case by the particular alloy steel used in the roller shell body and its dimensions. Tungsten carbide particles were introduced to the weld puddle area by means of a tube feeder. The carbide distribution was uniform throughout the height cross section of the melt puddle. An actual matrix hardness of Rc.58–72 was achieved near the surface; the hardness variation is due to the closely interspersed carbide particles embedded in the carburized steel matrix. At the carbide-metal interface, a matirx hardness Rc.61–65 was achieved. The shell core hardness was Rc.28–30, and the carbide shell edge hardness was Rc.59–60. The hardness at the roller bore was Rc.54–55. The resultant hard surfaced roller shell has proved satisfactory from both a surface hardness and matrix toughness standpoint.

The thin weld overlay with uniformly dispersed carbide particles within it produced by the method of this invention improves the durability of the hard surfaces for the following reasons: the process produces a uniform concentration of the carbide particles depthwise throughout the weld puddle. The carbides do not descend to the bottom of the overlay as is the normal case. The sinking of the carbide particles in the normal case leaves the top layer of the steel devoid of the wear-resistant carbide particles. The process of this invention achieves a much higher effective hardness within the entire thickness of the weld overlay because of the uniform carbide distribution achieved.

The present process further achieves a higher matrix hardness in the steel within the weld puddle so as to give it a high fatigue resistance with fatigue strength in the order of 0.5 times the tensile strength. In addition, the process achieves maximum toughness of the roller shell which now may be a low carbon carburizing grade of steel and which can resist brittle fracture of the entire structure under momentary high loads.

A further alternative development of this invention would employ the use of lower-density hard particles such as titanium carbide or aluminum oxide substituted in part for the tungsten carbide particles. The lighter, hard ceramic particles along with controlled size distribution of each of these types of particles can be mixed to control their distribution as demanded by the operational requirements. In this case, a lower total surface hardness may be traded off for a more uniformly hard surface. An alternative to feeding the tungsten carbide particles directly into the weld puddle would be to employ a thin walled steel tube filled with carbide particles. In this case, the tube will be gradually fed into the arc at a controlled rate which melts the tube and permits the carbide particles to disperse into the weld puddle.

Although I have described in detail a single embodiment of my invention, I do not wish to be limited in the scope of my invention except as limited by the scope of the following claims.

I clam:

1. A method of hard surfacing a steel roller which comprises:
   carburizing the steel surface of the roller to a depth equal to at least half the depth of the hard surfacing required;
   applying hard surfacing particles by immersing them in a weld puddle formed on the steel surface from the steel itself by a non consumable gas metal arc welding puddle process so that a uniform dispersion of particles is present in the weld whereby a high effective hardness within the entire thickness of the weld is obtained; and
   heat treating the weld to achieve the required properties of base and surface structures.

2. The method of claim 1 wherein:
   the steel to be hard surfaced is a low carbon carburizing grade of steel.

3. The method of claim 2 wherein:
   the hard surface is applied to a steel roller shell and the diameter of said hard surfacing particles are a fraction of the weld puddle depth whereby said hard surfacing particles are encased in the steel matrix to form a wear-resistant surface.

4. The method of claim 1 wherein:
   the carburization of the steel surface is accomplished by means of an endothermic gas atmosphere applied at 1600° F (871° C) and wherein the gas atmosphere has dew point in accordance with standard carburizing tables to achieve a 0.8 percent carbon enrichment.

5. The method of claim 1 wherein:
   the hard surface is applied by means of a tungsten inert gas welding process.

6. The method of claim 5 wherein:
   a balanced wave power supply is utilized for greater stability of tungsten arc.

7. The method of claim 1 wherein:
   the hard surfacing particles are introduced into the weld puddle area by means of a tube feeder.

8. The method of claim 1 wherein:
   the hard surfacing particles are introduced into the weld puddle by means of a consumable tube containing the particles.

9. The method of claim 1 wherein:

a mixture of hard surfacing particles by both composition and density is utilized to obtain a more even distribution of hard particles within the hard surface layer.

10. The method of applying a hard surface layer to a carburizing grade of low alloy steel comprising:

precarburizing the surface by means of an endothermic gas atmosphere to accomplish a 0.8 percent surface carbon enrichment;

producing a weld puddle from the steel itself on the steel surface approximately twice the depth of precarburization by means of a non consumable tungsten inert gas welding process;

introducing into the weld puddle hard surface particles with controlled size and particle composition so as to form a uniform dispersion of said particles within said weld puddle so that a high effective hardness within the entire weld is obtained; and post weld heat treating the resulting surface to achieve the required hardness.

11. The method of claim 10 wherein:

the hard surface particles are tungsten carbide.

12. The method of claim 10 wherein:

the hard surfacing particles are a mixture of hard surfacing particles.

* * * * *